United States Patent [19]

Oborsh et al.

[11] 3,852,483
[45] Dec. 3, 1974

[54] INTERMEDIATE MOISTURE FOOD WITH MONOGLYCERIDE AND PROPYLENE GLYCOL PRESERVATIVE

[75] Inventors: Edward V. Oborsh, Ballwin, Mo.; Robert K. Mohrman, Belleville, Ill.

[73] Assignee: Ralston Purina Company, St. Louis, Mo.

[22] Filed: Oct. 24, 1972

[21] Appl. No.: 299,903

Related U.S. Application Data

[63] Continuation of Ser. No. 14,225, Feb. 25, 1970, abandoned.

[52] U.S. Cl. .................. 426/94, 426/141, 426/152, 426/103, 426/305, 426/346
[51] Int. Cl. ............................ A23l 1/10, A23l 3/34
[58] Field of Search .............. 99/2 R, 17, 14, 100 P, 99/82, 83, 153; 426/92, 94, 103, 141, 147, 152, 215, 227, 805, 305, 346

[56] References Cited
UNITED STATES PATENTS

| | | | |
|---|---|---|---|
| 2,980,543 | 4/1961 | Hale et al. | 99/100 |
| 3,119,691 | 1/1964 | Ludington et al. | 99/2 R |
| 3,202,514 | 8/1965 | Burgess et al. | 99/2 R |
| 3,464,828 | 9/1969 | Cummisford | 99/82 |
| 3,467,525 | 9/1969 | Hale et al. | 99/2 R |

*Primary Examiner*—Wilbur L. Bascomb, Jr.
*Assistant Examiner*—Curtis C. Ribando
*Attorney, Agent, or Firm*—R. W. Brukardt

[57] ABSTRACT

An improved intermediate mositure food product and process is disclosed. The product has an improved shelf life and moisture retention and exhibits improved stability and resistance to bacaterial and mycotic contamination without using palatability depressing preservatives or a high sugar content. The material achieves its moisture stability and shelf life by having a glyceryl monostearate starch modifying system and a propylene glycol preservative system. The material can be fat coated to improve the texture and moisture retention and later given a heat treatment to modify the texture.

8 Claims, No Drawings

INTERMEDIATE MOISTURE FOOD WITH MONOGLYCERIDE AND PROPYLENE GLYCOL PRESERVATIVE

This is a continuation of application Ser. No. 14,225 filed Feb. 25, 1970, now abandoned, entitled INTERMEDIATE MOISTURE FOOD PRODUCT.

BACKGROUND OF THE INVENTION

This invention relates to the art of producing intermediate moisture food products and particularly to the art of producing intermediate moisture pet food products. It is known in the art that intermediate moisture products can be produced which will resist bacterial and mycotic attack on storage in ambient conditions. Typical intermediate moisture products are disclosed in U.S. Pat. No. 3,202,514 and in U.S. Pat. No. 3,115,409.

Intermediate moisture products of the prior art have relied on a number of materials to preserve and add moisture stability to the products. Typically, they have resorted to a variety of chemicals to gain the moisture retention, bacterial resistance, antimycotic activity and textural stability needed to provide a nutritious, palatable and shelf stable material. However, many of the chemical materials used are satisfactory for one function, but are undesirable for others. As a result, it has not been possible to produce an optimum product. The ingredients which are added for one purpose produce a negative effect on other desirable properties. For example, sorbic acid and salts of sorbic acid are commonly added to increase the bacterial and mycotic resistance of intermediate moisture products, but levels of the sorbic acid and sorbate materials add an undesirable chemical odor and flavor to the product which reduces the palatability of the material.

Sugars have also been used as a preservative and humectant material, but the use of some sugars has undesirable effects. High sugar may have the property of increasing digestive disorders in some animals, particularly in older animals. More importantly, sugar is not completely functional as humectant material in intermediate moisture rations because it will give up moisture to the surrounding atmosphere on storage. This results in a dry, brittle, hard ration which is not acceptable or palatable to animals.

SUMMARY OF THE INVENTION

We have discovered that an intermediate moisture product having between 20 and 35 percent water by weight can be produced which has superior shelf life, moisture retention, stability, nutritional, and organoleptic properties by incorporating a starch modifying material in the proteinaceous-farinaceous base of the material. The product retains moisture readily in the modified starch-protein matrix and preserves the moisture content and texture during storage. Preferably, the moisture content of the finished product is between 28 and 32 percent by weight. The modified material is shelf stable and may be preserved against bacterial and mycotic degradation by use of a propylene glycol (1,2-propanediol) preservative, allowing reduction or even complete elimination of sorbic acid, sorbate salts, and similar palatabiility reducing preservative materials. By using the starch modifying material and a propylene glycol preservative, it is also possible to reduce the sugar content or eliminate sugar from the product. The elimination of sugars from the product allows a product to be produced which minimizes, if not completely eliminating, the physiologically undesirable effects of high sugar consumption.

The product can be treated to modify the textural properties, after the product is formed, to provide a variety of properties in the finished material. The product may be coated with a fat which is a solid at room temperature to provide an additional water impermeable barrier around the product or it may be coated with a fat material and heated, by infrared frying, for example, to provide additional palatability enhancing effects. The product is nutritionally complete and provides an excellent ration for pets and other small animals, such as dogs, cats, pigs, mink, or other meat eating animals.

DESCRIPTION OF THE PREFERRED EMBODIMENTS

Intermediate moisture products are well-known, particularly in the art of producing pet food materials, and they have found good market acceptance. However, the intermediate moisture products have some deficiencies which inhibit the marketing of these materials and prevent them from achieving an even greater and more pervasive market acceptance. Typically, intermediate moisture products contain sorbic acid or sorbate salt preservatives to give stability and resistance to bacterial and mycotic growth. Unfortunately, sorbic acid and sorbate salts reduce the palatability of pet foods, so it is not possible to make a pet food of optimum palatability containing sorbic acid or sorbate salts. Intermediate moisture products tend to lose their moisture content over a period of time and to dry out, causing a loss of their pleasing soft texture. Intermediate moisture products, particularly those preserved with sugar, are not able to bind the water content sufficiently tightly to hold the water in the product matrix and keep the product from drying out.

Applicants have discovered that by eliminating the sugar in the intermediate product and by using a farinaceous or starch base which is modified to hold water in the matrix an intermediate product can be produced which has the water bound extremely tightly in the product matrix and which will resist drying out. Normally a product of this type will contain from 15 to 60 percent by weight of a farinaceous or starchy base, from 15 to 60 percent by weight of a proteinaceous base, 20 to 35 percent by weight water and from about 0.25 to 0.75 percent by weight of a starch modifying compound, for example, a mono or diglyceride, such as glyceryl monostearate. Preferably, the starch modifying compound is added at a level of about 0.5 percent by weight. Above a level of about 0.75 percent by weight a reaction takes place with the starch which results in the product being too dense. Below a level of about 0.25 percent by weight the starch material does not hold water sufficiently to give a satisfactory shelf life in the product. A particularly satisfactory starch modifying compound is a mixture of glyceryl monostearate and glyceryl monopalmitate having minor proportions of diglycerides in the mixture. The material is readily available under the trade name of DREWMULSE produced by Drew Chemical Company.

We have discovered that by adding a propylene glycol (1,2-propandiol) preservative to the modified starch material it is possible to eliminate sorbic acid and sorbate salts and improve the palatability of the product. Typically, the product will contain from about 5 to 15 percent by weight propylene glycol, preferably about 11 percent by weight. The propylene glycol or part of it may be sprayed on the surface of the formed product to heighten the bacteriastatic and antimycotic action, since bacterial and mold growth is most prevalent on the surfaces of food materials. If used in this way, between about 3 and 8 percent by weight propylene glycol is added to the product surface.

The product may also be coated with a fat material to add additional palatability and energy content to the material. Usually an intermediate moisture food product will contain from about 5 to 12 percent by weight fat. The fat may be a vegetable fat which is a solid at room temperature, such as coconut fat and it may also be coated on the surface. When fat is added in this fashion in proportions of about 1 to 5 percent by weight of the total product, it adds an additional moisture barrier on the surface of the material and aids in retaining the moisture content and desirable texture. The coconut fat is usually added by spraying an aqueous dispersion at a temperature just slightly above the congealing point of the fat, usually about 60°F. above the congealing point. The sprayed fat congeals in a layer on the product surface and does not penetrate the product appreciably. The layered fat forms a smooth coating which provides a barrier to the escape of moisture from the product. The fat also has the effect of increasing the good appearance and palatability of the product. Cats in particular find a product treated in this fashion very palatable.

Another desirable alternative for applying fat is to coat the formed product with a fat and then subject the fat coated product to a heating step to drive the fat into the surface of the material. Material which has had the surface permeated with a fat, such as tallow, has been shown to exhibit a very high palatability for some animals, notably dogs. A particularly good method for fat treating an intermediate moisture material of this type is to coat the material with a fat, such as an animal fat, and subject it to an infrared frying process. A preferred process exposes the fat coated material to an infrared source at about 460°F. for about 45 seconds to bring the product temperature to between about 160° and 180°F.

A process for producing an improved intermediate moisture pet food of the type disclosed would involve mixing the ration basel containing a farinaceous or starchy base and a proteinaceous base with fortifying vitamins and minerals and a starch modifying material in proportions sufficient to provide about 0.5 percent starch modifying material in the total ration. The mixture may have the total moisture adjusted to about 30 to 35 percent by weight and the mixed material is heated to cook the proteinaceous base and to subject the farinaceous or starchy material to a partial gelatinization step and the action of the starch modifying material. The starch modifying material acts on the starch during the heating or cooking step to swell or modify the gelatinized starch matrix to cause it to take up additional water and to keep it tightly bound in the starch matrix. After the material has cooked to the point where the starch has been modified to take up water, the material is formed into a shape such as a cylinder and/or a hamburger type patty.

A preferred method of cooking and forming the material is to use a cooker-extruder which expels the cooked material at a temperature of about 290° to 325°F. and at a pressure of about 600 psig. A typical extruder is described in U.S. Pat. No. 3,496,858. The expelled material is cut into cylinders and may be coated with fat and formed into patties; additional water may be added to the material to adjust the moisture content of the finished product. The moisture content of the final product will be between 20 to 35 percent by weight, preferably between 28 and 32 percent by weight.

The material may be coated with fat after forming and then packaged. Usually the fat will be applied by spraying a dispersion of fat and water on the surface of the material, the water serving to adjust the moisture content of the formed material to provide the desired moisture content in the final product. The propylene glycol preservative material may be sprayed on the formed base material with the fat and water or it may be mixed with the base materials prior to extruding or forming. It may be advantageous in some instances to mix some of the propylene glycol material with the base materials and to spray the balance of the preservative on the surface of the formed base materials.

The finished product has a desirable intermediate moisture content of between about 20 to 35 percent water by weight, preferably between about 28 to 32 percent water by weight. The product exhibits superior moisture retention and textural properties on storage and retains its desirable softness. The product has high palatability and organoleptic properties and does not require the high sorbate salt and sorbic acid preservatives of the prior art to achieve stability against bacterial and mycotic growth. The product does not contain the high sugars of the prior art and avoids the undesirable effects of high sugar consumption in animals.

Although the invention concepts will be readily understood from the above description by one having ordinary skill in the art, the following examples are given to assure a complete understanding.

EXAMPLE 1

An intermediate moisture cat food having a complete propylene glycol preservative system and no sorbate or sugar preservative system was prepared by mixing a basel ration of:

| | |
|---|---|
| 10 | parts ground chicken |
| 11 | parts ground corn |
| 2.5 | parts dried brewer's yeast |
| 11 | parts gluten meal |
| 6 | parts 50% soybean meal |
| 5 | parts fish solubles |
| 2 | parts dried whey |
| 10 | parts wheat flour |
| 32 | parts poultry meal |
| 5 | vitamin and mineral supplement |
| .15 | parts dyes |
| 5 | parts propylene glycol |
| .5 | parts glyceryl monostearate |

After mixing, the basel mixture was tempered to a moisture content of 32 percent by weight in a cut flight screw conveyor preconditioner by adding water and steam and extruded through a 125 hp. extruder having a screw operating at about 150 rpm. The extruder was operated at a temperature of 290°F. and a pressure of 600 psig. The material issued from the extruder as a thin rope and was cut into 3/4 inch × 3/16 inch cylinders by a set of 2 ½ 1/2 inches rotating knives attached to the extruder. Eighty parts by weight of the extruded cylinders were coated by spraying a dispersion of 0.05 parts onion powder, 5.5 parts melted animal fat, 1.0 parts phosphoric acid, 6.0 parts propylene glycol and 15 parts water at 190°F. onto the cylinders while tumbling in a rotating tumbling drum. The final product had a moisture content of 28 percent by weight (Karl Fischer). Bacterial resistance tests were conducted on the product. The tests are summarized in Table II.

EXAMPLE 2

An intermediate moisture cat food similar to that produced by the method of Example 1 was produced by extruding a basel ration prepared by mixing:

| | |
|---|---|
| 10 | parts ground chicken |
| 11 | parts ground corn |
| 2.5 | parts dried brewer's yeast |
| 11 | parts gluten meal |
| 6 | parts 50% soybean meal |
| 5 | parts fish solubles |
| 2 | parts dried whey |
| 10 | parts wheat flour |
| 32 | parts poultry meal |
| 5 | parts vitamin and mineral supplement |
| .15 | parts dyes |
| 5 | parts propylene glycol |
| .15 | parts potassium sorbate |
| .15 | parts sorbic acid |
| .5 | parts glyceryl monostearate |

After mixing, the basel was tempered to a moisture content of 32 percent by weight and extruded through the extruder of Example 1 operating at about 150 rpm. The extruder was operated at a temperature of 290°F. and a pressure of 600 psig. The material issuing from the extruder was cut into 3/4 inch × 3/16 inch cylinders by the rotating knife system described in Example 1. Eighty parts by weight of the extruded cylinders were coated by spraying a dispersion of 0.05 parts onion powder, 5.5 parts melted animal fat, 1.0 parts phosphoric acid, and 15 parts water at 190°F. in the tumbling drum described in Example 1. The final product had a moisture content of 28 percent by weight (Karl Fischer). Bacterial resistance tests were conducted on the product. The tests are summarized in Table II.

EXAMPLE 3

An intermediate moisture dog food having a complete propylene glycol preservative system and no sorbate or sugar preservative system was prepared by mixing a basel ration of:

| | |
|---|---|
| 14 | parts ground corn |
| 15 | parts 50% soybean meal |
| 1 | part brewer's yeast |
| 1 | part wheat germ |
| 9 | parts carcass beef |
| 6 | parts ground liver |
| 15 | parts wheat flour |
| 5 | parts wheat starch |
| 25 | parts meat and bone meal |
| 3 | parts vitamin and mineral supplement |
| .002 | parts dyes |
| 5 | parts propylene glycol |
| .5 | parts glyceryl monostearate |

After mixing, the basel mixture was tempered to a moisture content of 32 percent by weight and extruded as described in Example 1. The extruder was operated at a temperature of 290°F. and a pressure of 600 psig. The material issuing from the extruder was cut into 3/4 inch × 3/16 inch cylinders. Eighty parts by weight of the extruded cylinders were coated by spraying a dispersion of 0.25 parts salt, 0.05 parts garlic powder, 10 parts melted animal fat, 0.5 hydrolyzed protein, 6.1 parts propylene glycol, and 15 parts water at 190°F. on the cylinders in a tumbling drum. The coated cylinders were conveyed to a Sandvick infrared fryer and exposed to an element temperature of 460°F. for 45 seconds. The final product had a moisture content of 22 percent by weight (Karl Fischer), 32 percent by weight (Brabender). Bacterial resistance and palatability tests were conducted on the product. The results of the tests are summarized in Tables I and II.

EXAMPLE 4

An intermediate moisture dog food was produced by extruding a basel ration prepared by mixing:

| | |
|---|---|
| 15 | parts ground corn |
| 7.3 | parts meat meal |
| 33.5 | parts 50% soybean meal |
| 22.0 | parts sucrose |
| 3.1 | parts soy hulls |
| 2.1 | parts sorbitol |
| 0.3 | parts potassium sorbate |
| 2.1 | parts propylene glycol |
| 0.2 | parts garlic |
| .01 | parts dyes |
| 3 | parts vitamin and mineral supplement |

After mixing, the basel mixture was tempered and extruded as described in Example 3. Eighty parts of the extruded material was cut into 3/4 inch × 3/16 inch cylinders and coated by spraying a dispersion of 5 parts melted animal fat, and 15 parts water at 190°F. on the cylinders in a tumbling drum. The coated cylinders were infrared fried as described in Example 3. The final product had a moisture content of 16 percent by weight (Karl Fischer), 22 percent by weight (Brabender). Bacterial resistance and palatability tests were conducted on the product. The results of the tests are summarized in Tables I and II.

EXAMPLE 5

An intermediate moisture cat food having a complete propylene glycol preservative system and no sorbate or sugar preservative system was prepared by mixing a basel ration of:

| | |
|---|---|
| 10 | parts ground chicken |
| 11 | parts ground corn |
| 2.5 | parts dried brewer's yeast |
| 11 | parts gluten meal |
| 6 | parts 50% soybean meal |
| 5 | parts fish solubles |
| 2 | parts dried whey |
| 10 | parts wheat flour |
| 32 | parts poultry meal |
| 5 | parts vitamin and mineral supplement |
| .15 | parts dyes |
| 5 | parts propylene glycol |
| .5 | parts glyceryl monostearate |

After mixing, the basel mixture was tempered, extruded and cut as described in Example 1. Eighty parts of cut cylinders were treated by spraying a dispersion of 0.05 parts onion powder, 1.0 parts phosphoric acid, 6.0 parts propylene glycol and 15 parts water on the cylinders in a tumbling drum. The treated cylinders were then coated with coconut fat having a melting point of 78°F. by spraying 5.5 parts melted coconut fat on the treated cylinders in the tumbling drum. The coconut fat was sprayed at a temperature of 190°F. and congealed on the surface of the treated cylinders and formed a shiny, moist appearing coating. The final product had a moisture content of 27 percent by weight (Karl Fischer).

EXAMPLE 6

An intermediate moisture dog food similar to that produced by the method of Example 3 was produced by mixing a basel ration containing:

| | |
|---|---|
| 14 | parts ground corn |
| 15 | parts 50% soybean meal |
| 1 | part brewer's yeast |
| 1 | part wheat germ |
| 9 | parts carcass beef |
| 6 | parts ground liver |
| 15 | parts wheat flour |
| 5 | parts wheat starch |
| 25 | parts meat and bone meal |
| 3 | parts vitamin and mineral supplement |
| .002 | parts dyes |
| 3 | parts propylene glycol |
| .5 | parts glyceryl monostearate |

After mixing, the basel mixture was tempered to a moisture content of 32 percent by weight and extruded as described in Example 3. The extruder was operated at a temperature of 290°F. and a pressure of 600 psig. The material issuing from the extruder was cut into 3/4 inch × 3/16 inch cylinders. Eighty parts by weight of the extruded cylinders were coated by spraying a dispersion of 0.05 parts garlic powder, 8 parts propylene glycol, 10 parts melted animal fat, 0.5 parts hydrolyzed protein, and 15 parts weight at 190°F. on the cylinders in a tumbling drum. The final product had a moisture content of 27 percent by weight (Karl Fischer).

EXAMPLE 7

An intermediate moisture dog ration was produced as described in Example 3 using a glyceryl monostearate level of 0.25 parts in the basel formulation. The final product had a moisture content of 25 percent by weight (Karl Fischer), 34 percent by weight (Brabender).

EXAMPLE 8

An intermediate moisture dog ration was produced as described in Example 3 using no glyceryl monostearate in the basel formulation. The final product had a moisture content of 25 percent by weight (Karl Fischer), 34 percent by weight (Brabender).

EXAMPLE 9

An intermediate moisture dog food was produced as described in Example 3 using an additional 0.15 parts by weight sorbic acid, and 0.15 parts by weight potassium sorbate, and no additional propylene glycol coated on the extruded basel. The final product had a moisture content of 26 percent by weight (Karl Fischer). Bacterial resistance tests were conducted on the product. The results of the tests are summarized in Table II.

EXAMPLE 10

An intermediate moisture dog food having a complete propylene glycol preservative system and no sorbate or sugar preservative system was prepared by mixing a basel ration of:

| | |
|---|---|
| 14 | parts ground corn |
| 15 | parts 50% soybean meal |
| 1 | part brewer's yeast |
| 1 | part wheat germ |
| 9 | parts carcass beef |
| 6 | parts ground liver |
| 15 | parts wheat flour |
| 5 | parts wheat starch |
| 25 | parts meat and bone meal |
| 3 | parts vitamin and mineral supplement |
| .002 | parts dyes |
| 3 | parts propylene glycol |
| .5 | parts glyceryl monostearate |

After mixing, the basel mixture was tempered to a moisture content of 32 percent by weight and extruded as described in Example 1. The extruder was operated at a temperature of 290° F. and a pressure of 600 psig. The material issuing from the extruder was cut into 3/4 inch × 3/16 inch cylinders. Eighty parts by weight of the extruded cylinders were coated by spraying a dispersion of 0.05 parts garlic powder, 10 parts melted animal fat, 0.5 parts hydrolyzed protein, 8 parts propylene glycol, and 15 parts water at 190° F. on the cylinders in a tumbling drum. The coated cylinders were conveyed to a Sandvick infrared fryer and exposed to an element temperature of 460° F. for 45 seconds. The final product had a moisture content of 22 percent by weight (Karl Fischer), 30 percent by weight (Brabender). Bacterial resistance tests were conducted on the product. The results of the tests are summarized in Table II.

EXAMPLE 11

An intermediate moisture dog food was produced as described in Example 3 using an additional 0.10 parts by weight sorbic acid and 0.10 parts by weight potassium sorbate. The final product had a moisture content of 25 percent by weight (Karl Fischer). Bacterial resistance and palatability tests were conducted on the product. The results of the tests are summarized in Tables I and II.

EXAMPLE 12

An intermediate moisture mink ration was produced as described in Example 3 by mixing a basel ration of:

| | |
|---|---|
| 4 | parts ground corn |
| 10 | parts ground wheat |
| 1.5 | parts oat meal |
| 2 | parts brewer's yeast |
| 30 | parts soybean meal |
| 30 | parts fish meal |
| 6 | parts vitamin and mineral supplement |
| 10 | parts full fat soybean flakes |
| .5 | parts glyceryl monostearate |
| 5 | parts propylene glycol |

After mixing, the basel mixture was tempered and extruded as described in Example 3. Eighty parts by weight of the extruded cylinders were coated by spraying a dispersion of 10 parts melted animal fat, 3 parts propylene glycol, and 15 parts water at 190°F. on the cylinders in a tumbling drum. The final product had a moisture content of 30 percent by weight (Karl Fischer).

TABLE I

Palatability Data
Method of Wilcox,
5 Days, Matched Pair, Sign Ranked Test
cf. Wiley (non-parametric)

| Comparison | Amount (lb.) Consumed | Preference | Level of Significance |
|---|---|---|---|
| Ex. 4 | 17.8 | 0 | |
| v. | | | $P<.01$ |
| Ex. 3 | 93.8 | 15 | |
| Ex. 3 | 26.5 | 1 | |
| v. | | | $P<.01$ |
| Ex. 10 | 87.6 | 14 | |
| Ex. 9 | 48.3 | 5 | |
| v. | | | $P<.15$ |
| Ex. 3 | 68.4 | 9 | |
| Ex. 4 | 6.4 | 0 | |
| v. | | | $P<.01$ |
| Ex. 11 | 94.3 | 15 | |

TABLE II

Bacterial Resistance
(Bacterial Count-Number)
Per Gram Analysis*

| Time (Days) | Example 1 | Example 2 | Example 3 | Example 4 | Example 9 | Example 10 | Example 11 |
|---|---|---|---|---|---|---|---|
| 0 | 830 | $12\times10^2$ | 400 | $41\times10^2$ | 100 | 330 | 100 |
| 1 | $23\times10^5$ | $21\times10^5$ | $58\times10^4$ | $41\times10^4$ | $73\times10^4$ | $36\times10^4$ | $40\times10^4$ |
| 2 | $73\times10^3$ | $16\times10^4$ | $84\times10^3$ | $31\times10^4$ | $67\times10^3$ | $14\times10^3$ | $36\times10^3$ |
| 3 | 500 | $11\times10^3$ | $10\times10^2$ | $88\times10^3$ | $22\times10^3$ | $10\times10^2$ | $30\times10^2$ |
| 4 | | | $16\times10^2$ | $34\times10^3$ | $57\times10^2$ | $37\times10^2$ | 900 |
| 6 | $23\times10^2$ | $17\times10^2$ | | | | | |
| 7 | | | 780 | $78\times10^2$ | $37\times10^2$ | $43\times10^2$ | 500 |
| 8 | $10\times10^2$ | $20\times10^2$ | | | | | |
| 9 | | | 950 | $51\times10^2$ | $15\times10^2$ | $18\times10^2$ | 510 |
| 10 | $10\times10^2$ | $15\times10^2$ | | | | | |
| 11 | | | 690 | $38\times10^2$ | $16\times10^2$ | $11\times10^2$ | 490 |
| 14 | $17\times10^2$ | $19\times10^2$ | | | | | |
| 15 | | | $10\times10^2$ | $90\times10^2$ | $28\times10^2$ | $22\times10^2$ | 800 |
| 17 | $13\times10^2$ | $17\times10^2$ | | | | | |
| 18 | | | 630 | $66\times10^2$ | $18\times10^2$ | 700 | 300 |

* Page 87 in "Examination of Foods for Enteropathogenic and Indicator Bacteria," Review of Methodology and Manual of Selected Producedures, U.S. Department of Health, Education, and Welfare, Division of Environmental Engineering and Food Protection, Milk and Food Branch, Washington, D. C. 20201.

It is apparent from the data in Tables I and II that the process of the invention provides a product which has unexpected palatability and storage properties and which successfully eliminates sorbate preservatives and deleterious sugars. By employing a starch modifying system it is possible to eliminate sugar as a humectant material and produce a product of superior moisture retention properties by using a starch modifying agent which prevents starch retrogradation. By using a propylene glycol preservative system it is also possible to eliminate sorbic acid and sorbate preservatives from the product. As shown by Table II, the bacterial resistance of the product containing the propylene glycol preservative system exceeds that of the conventionally preserved materials. The product resulting from the use of a starch modified matrix and a propylene glycol preservative system unexpectedly has superior palatability and stability properties; the palatability of modified starch matrix-propylene glycol preserved products greatly exceeds that of conventional soft moist products.

Applicants' invention is defined in the appended claims and is not to be construed as being limited to the specific embodiments disclosed.

We claim:

1. A process for producing an improved, intermediate moisture food product of the low sugar type having a starchy base and having a moisture content of from about 20–35 percent by weight, comprising mixing about 15–60 percent by weight of farinaceous base materials, about 15–60 percent proteinaceous materials, and about 20–35 percent by weight water, and mixing a glyceryl monostearate starch conditioner in proportions of between about 0.25–0.75 percent by weight of the product capable of reacting with the starch to cause the starch to tightly bind water and resist drying and extruding the mixture at high temperature and pressure to form the mixture into particles, adding a propylene glycol preservataive system to the surfaces of the formed particles in proportions of between about 3–8 percent by weight, coating the preserved particles with fat, and heating the fat coated particles.

2. The method of claim 1 wherein the material is extruded at a temperature of from about 290°–325°F. and at a pressure of about 600 psig. at the extrusion nozzle.

3. The method of claim 1 wherein the moisture content of the final product is between about 28–32 percent by weight.

4. The method of claim 1 wherein a propylene glycol preservative is added to the mixed material prior to extrusion and the final product contains between about 5 and 15 percent by weight of propylene glycol preservative.

5. A process for producing an improved intermediate moisture food product of the type having a moisture content of between about 20–35 percent by weight comprising mixing about 15–60 percent by weight of farinaceous base materials, about 15–60 percent proteinaceous materials, about 0.25–0.75 percent by weight of a glyceryl monostearate starch conditioner, a propylene glycol preservative system, and about 20–35 percent by weight water, extruding the mixture at a temperature of from about 290°–325°F. and at a pressure of about 600 psig. at the extrusion nozzle, cutting the extruded material to form cylindrical particles, coating the surfaces of the formed particles with between about 3–8 percent by weight of a propylene glycol preservative and between about 5 to 12 percent by weight fat and heating the coated particles to form an intermediate moisture food product having a moisture content of between about 20–35 percent weight water and containing between about 5 and 15 percent by weight propylene glycol preservative.

6. The method of claim 5 wherein additional flavoring materials are added to the surfaces of the formed particles.

7. The method of claim 6 wherein the additional flavoring materials are selected from the group consisting of hydrolyzed protein and garlic powder.

8. An improved intermediate moisture food product having a starchy base and having a water content of from about 20–35 percent by weight, the product being formed from about 15–60 percent by weight farinaceous base materials, about 15–60 percent proteinaceous materials, and about 0.25–0.75 percent by weight glyceride starch conditioner selected from the group consisting of glyceryl monostearate and glyceryl monopalmitate and mixtures thereof, the starch conditioner being reacted with the starch to cause the starch to tightly bind the water and resist drying, the product being preserved with a coating of between about 3–8 percent by weight of propylene glycol and having between about 5–15 percent by weight total propylene glycol content, the product being in the form of discrete particles and having a coating of between about 5–12 percent by weight fat.

* * * * *

UNITED STATES PATENT OFFICE
CERTIFICATE OF CORRECTION

Patent No. 3,852,483    Dated Dec. 3, 1974

Inventor(s) Edward V. Oborsh, Robert K. Mohrman

It is certified that error appears in the above-identified patent and that said Letters Patent are hereby corrected as shown below:

In the Abstract, the word "mositure" should read "moisture".

In the Abstract, the word "baceterial" should read "bacterial".

Column 3, line 24, "60°F" should read "6°F".

Column 4, line 38, the word "invention" should read "inventive".

Column 5, line 1, delete "1/2".

Column 7, line 32, the word "weight" should read "water".

Column 10, line 13, the word "preservataive" should read "preservative".

In the caption under Table II, the word "Producedures" should read "Procedures".

Signed and sealed this 13th day of May 1975.

(SEAL)
Attest:

RUTH C. MASON
Attesting Officer

C. MARSHALL DANN
Commissioner of Patents
and Trademarks